March 5, 1957   D. PERINONI   2,783,862
FISHING REELS
Filed Aug. 10, 1953
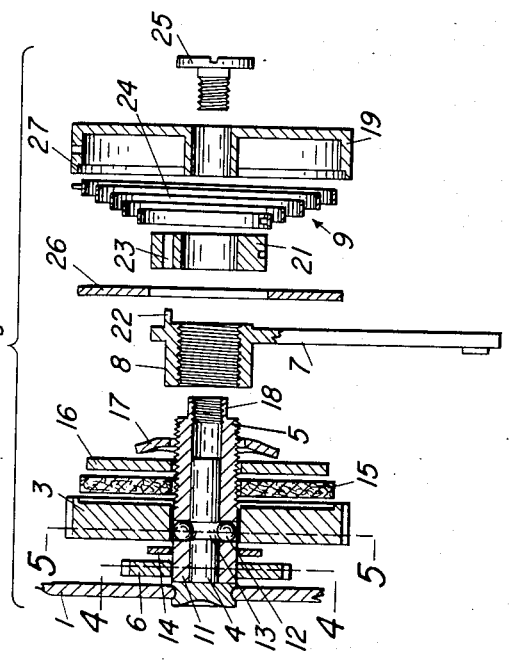
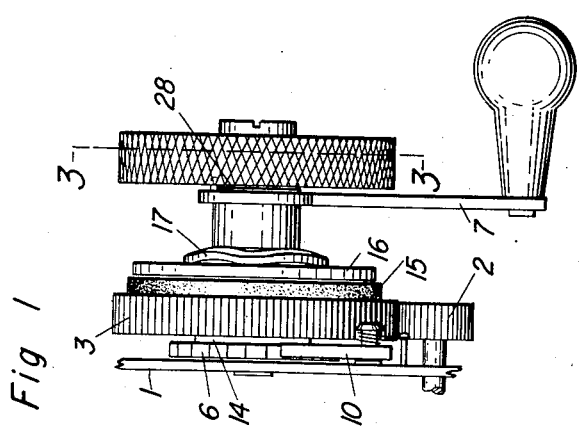
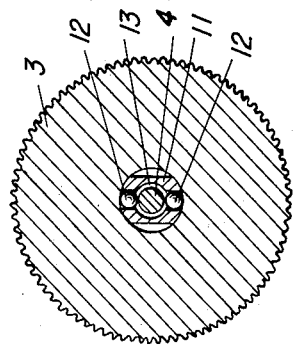
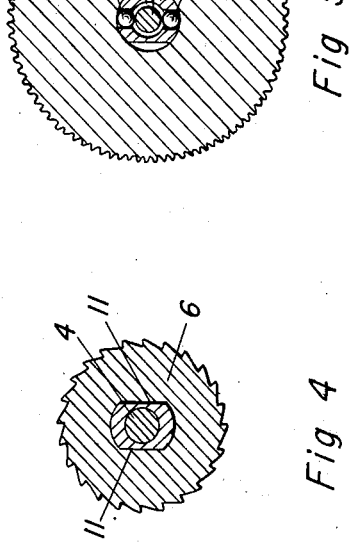
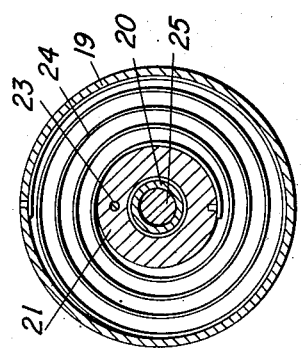
INVENTOR.
Dominic Perinoni
BY
A. Schapp
Att'y

United States Patent Office 2,783,862
Patented Mar. 5, 1957

2,783,862

FISHING REELS

Dominic Perinoni, Mendota, Calif., assignor to Dix Manufacturing Co., San Jose, Calif., a corporation of California Application August 10, 1953, Serial No. 373,262

1 Claim. (Cl. 192—14)

The present invention relates to improvements in fishing reels, and has particular reference to the drive mechanism for the reel and the drag feature usually incorporated therein.

The most commonly used drag feature known heretofore is the so-called star drag arrangement, in which the handle for operating the reel spindle is positively secured upon the shaft on which the drive gear is mounted, and the star drag is operated independently of the handle for producing a desired amount of give in the clutch connection between the shaft and the drive gear.

In the present invention it is proposed to eliminate the star drag, and to incorporate the drag feature directly into the connection between the handle and the drive shaft.

It is further proposed to arrange the drag feature in such a manner that it becomes operative automatically in response to a reverse turning movement of the handle.

It is still further proposed to provide an arrangement of the character described in which the drive may be adjusted to offer any desired amount of drag through successive fishing operations, until re-adjusted to a different degree of drag.

And finally, it is contemplated to arrange a drive for a fishing reel in which the degree of drag may be adjusted simply by the turning of a knob or drum from one locked position to another.

Further objects and advantages of my invention will be disclosed as the specification continues, and the new and useful features of the same will be fully defined in the claim attached hereto.

The preferred form of my invention is illustrated in the accompanying drawing, forming part of this application, in which:

Figure 1 shows a side view of my driving mechanism as attached to a fishing reel frame, the latter being shown only fragmentarily;

Figure 2, an exploded sectional view of the same mechanism;

Figure 3, a cross-section taken along line 3—3 of Figure 1;

Figure 4, a section taken along line 4—4 of Figure 2; and

Figure 5, a section taken along line 5—5 of Figure 2.

While I have shown only the preferred form of my invention, I wish to have it understood that various changes or modifications may be made within the scope of the claim attached hereto, without departing from the spirit of the invention.

Referring to the drawing in detail, my drive mechanism is shown as being applied to one of the end members 1 of a conventional frame for a fishing reel having two parallel end members and a spool revolvably supported therebetween.

The spindle shaft carries a pinion 2 which meshes with the driving gear 3, the mounting and operation of which is the principal concern of the present invention.

The mounting for the drive gear comprises in its principal features a post 4 projecting sidewise from the end member 1, a hollow shaft 5 revolvable thereon and having a ratchet wheel 6 fixed thereon adjacent the end member and having the drive gear revolvable thereon, a clutch connection between the shaft and the drive gear, a handle 7 having a sleeve 8 adapted for screwing upon the end of the shaft, and means generally shown at 9 for interlocking the handle and the shaft.

For the purposes of the present description, it is assumed that the handle 7 is turned clockwise, as viewed from the right end of Figure 1, for winding the spool, and that for the unwinding of the spool, as occasioned by a fighting fish at the end of the line, it is necessary to allow the drive gear to turn counter-clockwise, with a desired drag to keep the line taut at all times.

The ratchet at the inner end of the shaft 5 is made to cooperate with a pawl 10 to prevent counter-clockwise movement of the shaft. The shaft is generally circular in cross-section, but has two opposing flat faces 11, and is held against endwise movement on the post by a pair of balls 12 mounted in radial holes in the shaft and engaging in an annular groove 13 in the post.

The clutch mechanism comprises a metal friction disc 14 slidable on the shaft between the ratchet and the gear, a leather washer 15 mounted upon the outer face of the gear, a second metal friction disc 16 slidable on the shaft next to the leather washer, and a spring wave washer 17 slidable on the shaft outside the disc 16, the discs 14 and 16 being made non-rotatable on the shaft by conforming to the outline thereof.

Due to this construction, when the washer 17 is forced inwardly, it crowds the disc 16, the washer 15, the gear 3 and the disc 14 toward the ratchet 6 into a compacted unit in driving relation with the shaft, the compactness of the unit depending upon the pressure exerted upon the washer 17.

Such pressure is exerted by the sleeve 8 of the handle 7 when it is screwed upon the free end of the shaft 5. This sleeve in its action to exert pressure against the clutch elements may be considered as comprising an element of the clutch.

Thus, when the sleeve, starting from the position shown in Fig. 2, is rotated clockwise and screwed up on the shaft toward the gear, it moves together on the shaft the gear and parts 14, 15, 16 and 17, bringing the disc 14 against the side of the ratchet 6. Until these parts come together, to provide some frictional engagement one with the other, the rotation of the shaft will be restrained by reason of the fact that the pawl is spring urged against the ratchet wheel and produces a drag thereon in the over-running direction of the pawl and ratchet. Thus the relative rotation between the handle 7 and shaft 5 is obtained. When the frictional engagement of the parts is attained, the shaft 5 and gear will rotate to turn the pinion 2 and the reel spool (not shown). Any restraint placed upon the turning of the reel spool while clockwise turning of the handle is continued, as by the action of pulling in a fish on a line carried by the spool or by holding the spool by hand, further forces together or compacts the elements of the clutch.

The hollow shaft has an internally threaded, reduced extension 18 projecting beyond the handle sleeve when the latter has been screwed home and this extension serves as a mounting means for the interlocking means between the handle and the shaft shown generally in exploded view at 9, in Figure 2.

The interlocking means comprises a drum or cylinder 19 having an internal annular flange 20 fitted upon and revolvable on the extension 18, a hub 21 revolvable upon the latter flange and secured upon the handle sleeve 8 by means of a pin 22 projecting from the latter into a hole 23 in the hub, and a spiral or clock spring 24 secured upon the hub and the drum in such a manner that the clock spring is wound when the drum is turned clockwise with respect to the hub.

The drum may be locked to the extension 18 by means of a screw 25 bearing on the outer end face of the drum and threaded into the extension 18. A cover plate 26 may be fitted in an annular ledge 27 in the drum, in encircling relation to the hub 21, so as to cover the spring 24.

In operation, with the different parts arranged on the shaft 5 in the manner shown in the left portion of Figure 2, the sleeve 8 of the handle 7 is screwed upon the free end of the shaft as hereinbefore set forth, until the parts form a solid, compacted unit, with substantially no give between the shaft and the drive gear.

As the handle is revolved clockwise, the drive gear rotates at the same speed as the handle, and the revolving movement tends to tighten the clutch engagement.

Assuming that the drum 19, the spring 24, the hub 21 and the cover plate 26 have been previously assembled into a compact unit, with all the other parts accommodated within the drum and with the spring under no tension, the flange 20 of the unit is then pushed upon the extension 18 to come up against the shoulder formed by the latter, care being taken that during this operation the pin 22 of the handle enters the hole 23 in the hub 21.

Next, the screw 25 is applied to the inside thread of the extension 18, to hold the locking unit in place, without final tightening, however. Now the hub 21, being anchored to the handle by the pin 22, is held by the latter against clockwise movement, since the handle is already screwed up tight against the clutch assembly, assuming, of course, that during the assembling operation, the spindle and the drive gear are held against rotation.

But the drum 19 is still capable of clockwise rotation as far as the spring will permit it to turn. When this limit has been reached, and the screw 25 is then tightened, the handle is firmly locked to the shaft, with the clutch in full engagement, and no play allowed for the drive gear.

It is the object of the present invention to provide means for partly releasing the clutch engagement to allow a fish at the end of the line to rotate the drive gear counter-clockwise if the fisherman so desires, with a desired drag on the drive gear.

To accomplish this, the fisherman, upon having turned the drum 19 clockwise as far as it will go, turns it back a short distance, say one-quarter of a turn, or one-half of a turn, depending upon the amount of drag desired, and then tightens the screw 25. This allows the hub 21 and the handle 7 to be turned backward a corresponding distance until the spring is under full tension again.

Any return, or anti-clockwise movement of the handle is accompanied by a loosening of the clutch engagement, allowing the drive gear to turn counter-clockwise, with a drag corresponding to the distance through which the drum has been turned backward from its extreme end position.

Assuming that a fish has been hooked, the fisherman can pull in the line by rotating the handle clockwise. If the fish pulls too hard and the fisherman desires to let out line, all he has to do is to draw back on the handle which automatically releases the clutch with a drag corresponding exactly to the previous setting of the drum 19, since the reverse movement of the handle with respect to the shaft 5 is limited by the spring 24.

It will be noted that when the handle is turned clockwise, as far as it will go for tightening the clutch engagement, as in Figure 1, there is a small space left between the handle and the drum, as at 28, to allow of a limited reverse movement of the handle.

I claim:

In a fishing reel comprising a frame for revolubly supporting a spool, a shaft supported by the frame for rotation, a pawl and ratchet means between the shaft and frame permitting rotation of the shaft in reel-winding direction only, a gear wheel mounted on the shaft and adapted to revolve freely thereon, clutch elements on the shaft coupling the gear wheel and shaft, a handle on and having screw threaded connection with the shaft and adapted to have movement axially of the shaft in one direction to cause the clutch elements to engage and effect driving connection between the gear wheel and the shaft when the handle is turned to effect turning rotation of the gear, and adjustable means connected to said handle and shaft for limiting reverse turning and axial shifting of the handle on the shaft by said screw threaded connection for controllably loosening the clutch coupling, said adjustable means including a spring means which is tensioned by and upon the said limited reverse turning of the handle and functioning upon release of the handle to turn the handle in the direction to tighten the clutch.

References Cited in the file of this patent

UNITED STATES PATENTS

| Number | Name | Date |
|---|---|---|
| 541,712 | Blume | June 25, 1895 |
| 837,489 | Myers | Dec. 4, 1906 |
| 905,679 | Farmer | Dec. 1, 1908 |
| 1,967,678 | Miller | July 24, 1934 |
| 2,120,068 | Griswold | June 7, 1938 |
| 2,209,598 | Coxe | July 30, 1940 |
| 2,254,989 | Benson | Sept. 2, 1941 |
| 2,269,808 | Cabassa | Jan. 13, 1942 |
| 2,280,180 | Van Cleave | Apr. 21, 1942 |
| 2,648,506 | Kirby | Aug. 11, 1953 |

FOREIGN PATENTS

| 31,966 | Germany | Jan. 17, 1885 |